C. W. ROBINSON.
GARDEN TOOL.
APPLICATION FILED DEC. 20, 1915.
1,224,957.
Patented May 8, 1917.
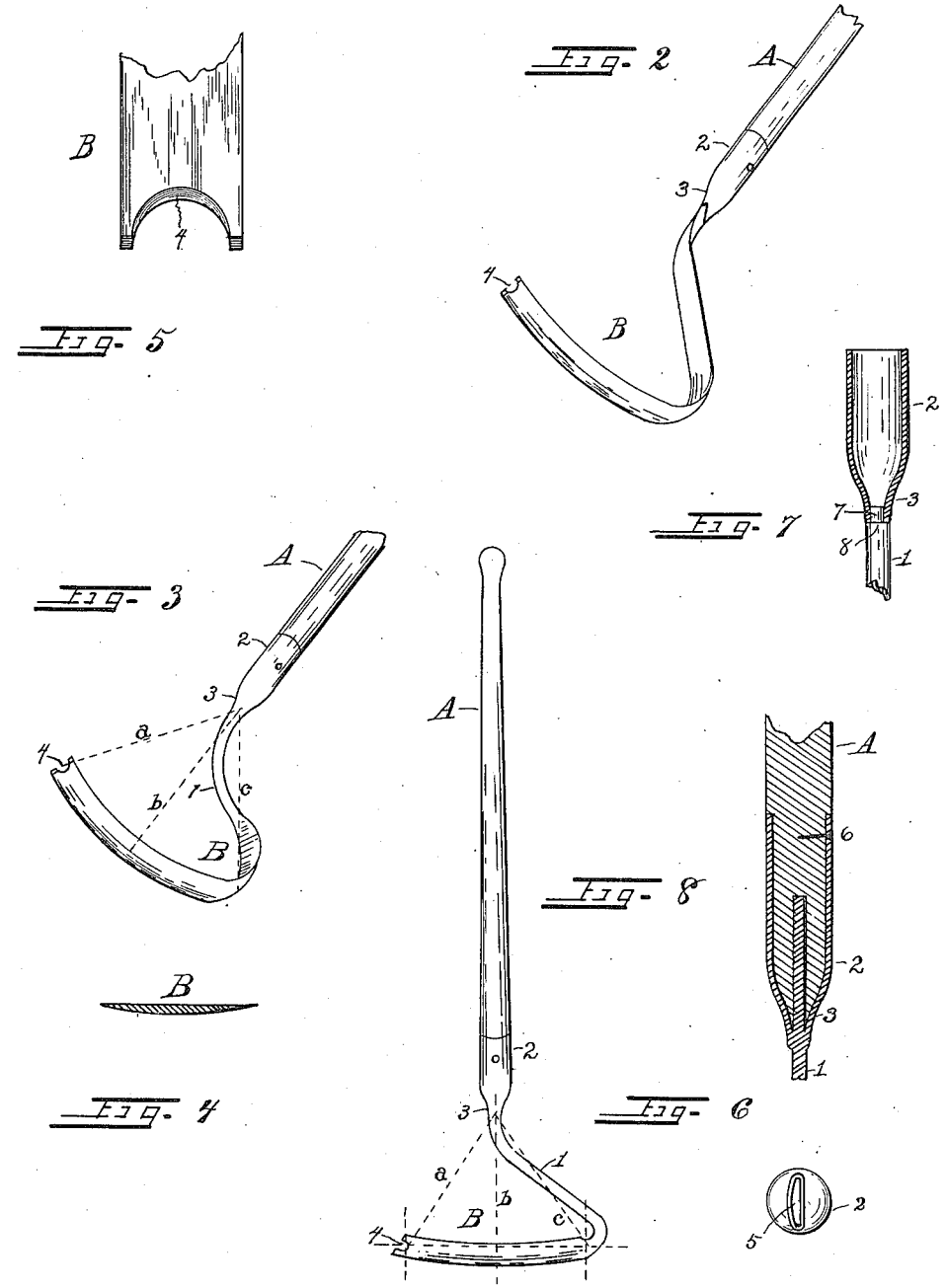
WITNESSES.
R. V. Randall
J. F. Fisher
INVENTOR.
Charles W. Robinson
By Victor E. Randall
Atty.

UNITED STATES PATENT OFFICE.

CHARLES W. ROBINSON, OF BATTLE CREEK, MICHIGAN.

GARDEN-TOOL.

1,224,957. Specification of Letters Patent. Patented May 8, 1917.

Application filed December 20, 1915. Serial No. 67,759.

*To all whom it may concern:*

Be it known that I, CHARLES W. ROBINSON, a citizen of the United States, residing at Battle Creek, in the county of Calhoun and State of Michigan, have invented certain new and useful Improvements in Garden-Tools, of which the following is a specification.

The present invention relates to garden tools in which the tool and its tang of one piece, together with a socket, are made inseparable through electric or other welding that a better connection may be made between said tool and its handle.

My invention comprises a tool of the character that will be of simple and economical construction and in which the tool proper may be used to equal advantage either side to; in other words, that in hoeing and cutting the soil no inconvenience will be experienced should the operator have occasion to reverse the cutting edges of the tool.

In its more complete scope my invention embodies a tool having a tang so curved and sharpened at its edges that it will provide a weeding and scuffing crook admirably adapted for the purpose.

Again, my invention comprises a hoe having at its free end a semi-circular slot formed with particular regard for cutting with alacrity noxious weeds, roots, etc., between closely grown garden truck that otherwise would require individual hand attention.

A further object of my invention is to so construct and hang the tool with its handle that a center draft will always be applied to the tool when used either side to or when the tool is used in an upright position as a narrow cultivating implement for stirring the ground for seed or garden purposes.

Again, my invention consists in certain details of construction and peculiar arrangement of its parts wherein the tool will be better adapted to the purpose than those heretofore provided, and whereby the tool together with its socket may receive the means for preventing the removal of the same from the handle.

The advantages described and also other objects and advantages will be hereafter more fully set forth in the following specification and pointed out in the appended claim, reference being had to the accompanying drawings forming a part of said specification and in which Figure 1 is an inclining plan view of an embodiment of my invention.

Fig. 2 is a perspective view of another embodiment of my improved garden tool.

Fig. 3 is another embodiment of my improved garden tool.

Fig. 4 is a cross-section of the tool on the line "$b$."

Fig. 5 is a broken detail view of the free end of the tool blade.

Fig. 6 is the reduced end view of a ferrule or socket such as is employed in the tool illustrated in Fig. 2.

Fig. 7 is a longitudinal section of a ferrule or socket and a round shank or tang.

Fig. 8 is a longitudinal section in modification.

Like marks of reference refer to corresponding parts throughout the different views, in which "A" represents the tool handle and "B" the tool.

In the embodiment shown in Fig. 1 the tool is formed with a round shank 1, the same being slightly curved where it meets the blade of the tool "B" and by preference angling in a comparatively straight line, thence being slightly curved and bent in alinement with the handle, at which point the tang or shank is formed integral with a seamless drawn ferrule 2, the latter of which has a reduced neck 3 into which the shank 1 of the tool is fitted and thence electrically or otherwise welded, the same forming a homogeneous piece simple and solid in construction and neat and tasty in design.

A paramount feature in the making of my improved tool is the peculiar manner in which I form and attach the same to its handle; as will be observed in the drawings, the blade "B" is at right angles with its handle and the center of the blade both crosswise and lengthwise is centrally located with respect to its handle for obvious reasons, chief of which is the ease and convenience with which the tool may be used in either hoeing, weeding, scuffing the soil or cutting off noxious weed growths.

In Figs. 1 and 3 the lines $a$ and $c$ represent angular extremities of the tool and $b$ the center or draft line, and as will be obvious, the line of draft or exertion given the handle will be equally distributed at both ends of the tool without especial or side thrust by the operator.

By preference the free end of the tool is formed with a rounded slot 4, having a rearwardly-sloping edge for the purpose of forming a curved knife capable of slicing off noxious weeds from between garden plants without injury to the plants, and it also forms a very unique and easy means for cutting out noxious root growths from lawns, grass plats, etc.

In Figs. 2 and 3 the cutting edge of the blade "B" is continued around the curve, in the former instance the blade and its shank being of a flattened nature partially rounded on one side and adapted to be received within a correspondingly-formed opening, as 5, at the indrawn end of a thimble or socket 2, as shown in Fig. 6, preparatory to welding.

In Fig. 3, the blade "B" has a round reduced shank 1 between the curve of the transverse blade and the socket 2.

By continuing the cutting edge of the blade about the curve to where it angles to join with its handle socket, a very effective tool is provided for working between closely growing plants where a larger or wider tool would be objectionable and, again, in hoeing the nature of the curve provides a very effective means for cutting off certain vegetable growths or reducing lumpy soil, not found in the longer cutting blades.

In Fig. 8 is shown a very effectual means for attaching the tool to its handle. In this instance the handle is formed with a slot or hole into which an extension of the shank projects after which a brad 6, or other means, is inserted through a small aperture in the socket and driven into the handle to secure the parts together.

In Fig. 7 the shank 1 has a reduced portion 7 which forms a shoulder 8, over the former and against the latter of which the neck 3 of the socket fits, the exterior of both socket and shank being flush and forming a uniformly smooth surface, requiring very little grinding after being united by welding.

I am aware that garden tools have been made with narrowed double-edged blades, and also that serrated ends have been provided at the end of the blade, but I am not aware of garden tools having been made in which the handle has been hung centrally of the transverse cutting blade that the tool could be used either side to with equal advantage and without muscle strain to the operator when holding the tool, or that a circular cutting edge has been formed at the end of the blade whereby the tool can be used to advantage for cutting off root growth without clogging, or that a cutting tool has been formed with a double-edged tang combined in a tool of the character set forth.

From the foregoing description taken in connection with the drawings, it is believed a more extended explanation of the working and advantages of my invention will not be necessary.

Having, therefore, set forth my said invention, what I claim as new and desire to secure by Letters Patent, is:

In a garden tool, a blade formed with double cutting edges and provided with a tang or shank forming a continuation of said blade and terminating in a handle attachment centrally to both a transverse and longitudinal dimension of said blade, said blade having a rounded slot with a sharp cutting edge at the free end thereof, substantially as and for the purpose set forth.

CHARLES W. ROBINSON.

Witnesses:
DEE HARRISON,
LEROY A. BECHTOL.